April 28, 1942.   C. W. SINCLAIR   2,281,330
MASTER CYLINDER
Filed March 20, 1939   2 Sheets-Sheet 1
FIG.I.
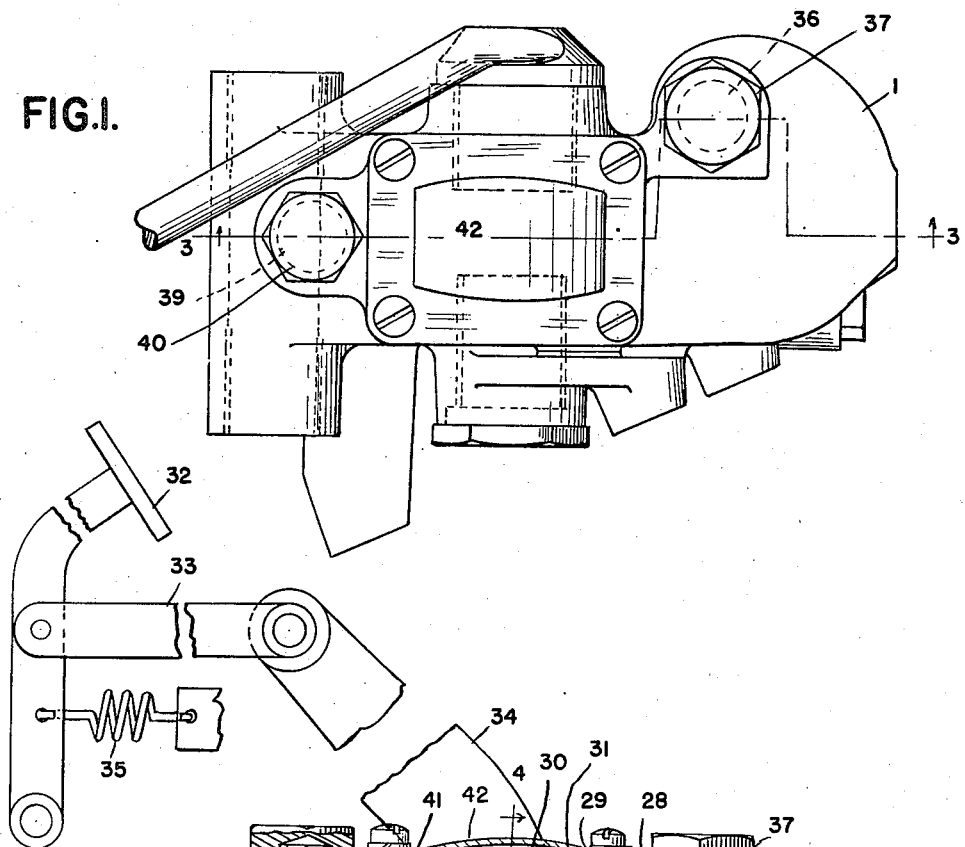
FIG.3.
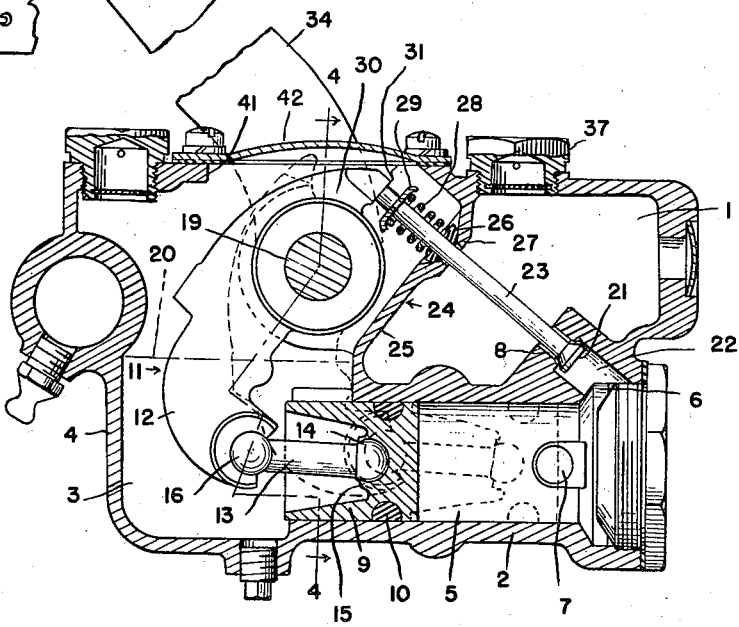
INVENTOR.
CHARLES W. SINCLAIR
BY
ATTORNEYS April 28, 1942.　　C. W. SINCLAIR　　2,281,330
MASTER CYLINDER
Filed March 20, 1939　　2 Sheets-Sheet 2

INVENTOR.
CHARLES W. SINCLAIR
BY
ATTORNEYS

Patented Apr. 28, 1942

2,281,330

UNITED STATES PATENT OFFICE 2,281,330

MASTER CYLINDER

Charles W. Sinclair, Detroit, Mich., assignor to Kelsey-Hayes Wheel Company, Detroit, Mich., a corporation of Delaware Application March 20, 1939, Serial No. 263,069

5 Claims. (Cl. 60—54.6)

The invention relates to master cylinders for developing braking fluid pressure to apply a brake.

The invention has for one of its objects to provide an improved construction of master cylinder in which the piston displacement has no effect upon the liquid in the reservoir and does not cause breathing in the reservoir with consequent possibility of entrance of dust and the like to contaminate the liquid. The invention has for other objects to so construct the master cylinder that the cylinder communicates at one end with a chamber which may contain a liquid extending over the exposed end of the piston in the cylinder and adapted to lubricate the wall of the cylinder engaged by the piston; to provide a liquid reservoir adapted to communicate with the cylinder to replenish the same and the remainder of the braking system with liquid and to separate the reservoir from the chamber so that change of the fluid in the chamber as effected by piston displacement has no effect on the conditions within the reservoir; and to provide means for moving the piston, including a shaft located at a height in the chamber sufficient to be above the level of the liquid, if used, in the chamber.

With these and other objects in view, the invention resides in the novel features of construction and combinations and arrangements of parts as more fully hereinafter set forth.

In the drawings:

Figure 1 is a plan view of a master cylinder showing an embodiment of my invention;

Figure 3 is a cross section on the line 3—3 of Figure 1;

Figure 2:
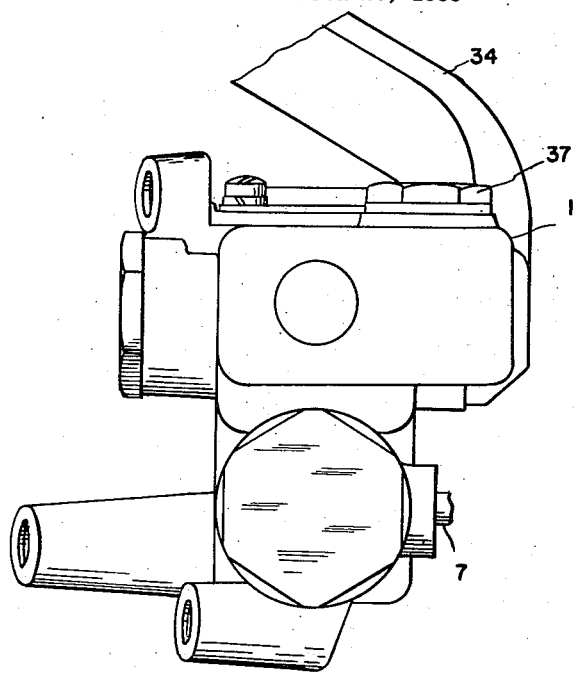
Figure 2 is an end view thereof.
Figure 4:
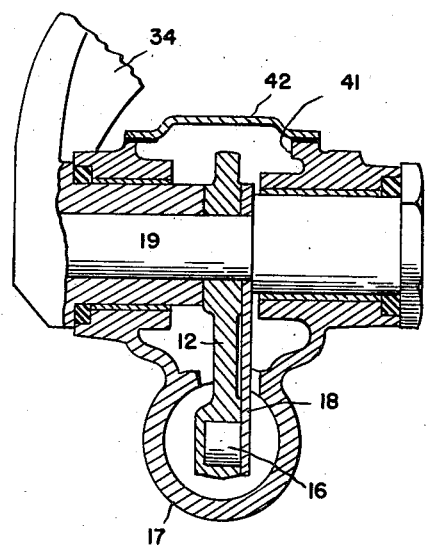
Figure 4 is a cross section on the line 4—4 of Figure 3.

The master cylinder, as illustrated in the present instance, is adapted to develop braking liquid pressure in that portion of the brake system including the wheel cylinders to apply the brakes of a motor vehicle. The master cylinder comprises the braking liquid reservoir 1, the cylinder 2 at the bottom of the reservoir and the fluid chamber 3 at an end of the reservoir and also an end of the cylinder, the latter end being open to place the chamber in communication with the cylinder. The reservoir, cylinder and chamber are preferably formed integrally in the body 4 of cast metal. The cylinder has the piston engaging portion 5 and the front portion 6 located in advance of the piston engaging portion and adapted to communicate with the tubing leading to the wheel cylinders through the port 7. The front portion is also adapted to communicate with the reservoir 1 through the opening or port 8 in its upper wall to permit flow of the braking liquid from the reservoir into the cylinder or flow of braking liquid from the cylinder into the reservoir. The opening or port also provides for flow of air from the cylinder into the reservoir and then into the atmosphere.

9 is the piston reciprocable within the piston engaging portion 5 of the cylinder and provided with the annular packing member 10 for engaging the cylinder engaging portion. This packing member prevents passage of the braking liquid from the portion of the cylinder in advance of the piston rearwardly past the piston. It also prevents passage of the fluid in the chamber 3 forwardly past the piston. The piston is adapted to be advanced and retracted by means of the bell crank lever 11 which is operatively connected to the piston by the lever 12 and the connecting rod 13. The connecting rod has at its front end the ball portion 14 engaging a correspondingly shaped seat in the head of the piston and secured thereto by suitable means, such as the peened-over flange 15 upon the head. The connecting rod also has the cylindrical portion 16 at its rear end engaging a correspondingly shaped seat in the lower end of the lever 12. The cylindrical portion is held from endwise disengagement by forming the lower end of the lever with the wall 17 beyond one end of the seat and by providing the plate 18 at the other end, this plate extending along the lever 12. The bell crank is fixedly mounted upon the shaft 19 which extends transversely through the side walls of the chamber 3 near its upper end and at a height sufficient to at all times be above the highest level 20 of the liquid, if used, in the chamber.

Ordinarily, it is desirable to employ a liquid in the chamber to extend over the exposed rear end of the piston and to lubricate the portion of the cylinder wall engaged by the piston. Preferably, the liquid is the same as the braking liquid in the reservoir and the remainder of the brake system. The portion of the chamber above the liquid is filled with air.

21 is a valve for closing the opening or port 8. The valve is movable into the bore 22 communicating with the front portion 6 of the cylinder and has the valve stem 23 which extends upwardly and at an angle within the reservoir and through the partition 24 which closes communication at all times between the reservoir 1 and the chamber 3. The partition is formed of the partition wall 25 and the packing member 26. The partition wall is integral with the body 4 and extends at approximately right angles to the valve stem and the packing member is located within the chamber 3 and surrounds the valve stem and is seated in the depression 27 of the partition wall. 28 is a coil spring located between the packing member and the C-washer or cap 29 upon the valve stem. This coil spring normally holds the valve in closed position and at all times exerts pressure upon the packing to maintain the same against the partition wall so that it will effectively seal the gap between the partition wall and the valve stem. The upper end of the valve stem which is located above the C-washer or cap is adapted to be engaged by the lever 30 of the bell crank, the construction being such that during the final portion of the retractile movement of the piston the valve will be moved to open position and will be held in open position while the piston is in retracted position. The retracted position is determined by means of the lug 31 preferably formed integral with the body 4 and engageable by the lever 30. The bell crank is adapted to be operated from the foot pedal 32 by suitable means, such as the link 33 connected at one end to the foot pedal and at the other end to the lever 34 which is fixedly secured to the shaft 19 outside the body 4. A suitable coil spring 35 connected to the foot pedal serves to normally hold the same in its retracted position.

The top portion of the body 4 in which the braking liquid reservoir 1 is formed is provided with the fill opening 36 through which the braking liquid may be poured into the reservoir. A suitable cap 37 provided with the restricted air passageway 38 extends over the fill opening. The top portion of the body 4 in which the fluid chamber 3 is formed is provided with the fill opening 39 through which the liquid may be poured into the chamber. The plug or cap 40 which may be provided with a restricted air passageway, if desired, extends over the fill opening 39. In addition, the top portion of the body in which the fluid chamber is formed is also provided with the enlarged opening 41 to provide for the necessary machining of the parts and also the assembly of the mechanism. This enlarged opening is closed by the cap 42 which is preferably formed of sheet metal.

With the above construction, it will be noted that the braking liquid reservoir 1 does not communicate at any time with the fluid chamber 3 so that reciprocation of the piston 9 and its consequent displacement does not affect the conditions in the reservoir, although it does change the conditions in the fluid chamber. More in detail, piston displacement causes a raising and lowering of the liquid, if used, in the fluid chamber and also a change in pressure of the air in the fluid chamber above the liquid if the cap or plug 40 is closed, or a breathing within the fluid chamber if the cap or plug is provided with a restricted passageway. However, by reason of the partition wall and packing between the reservoid and the fluid chamber such change in pressure or breathing in the fluid chamber cannot change the conditions in the reservoir to affect either the level of the liquid in the reservoir or breathing in the reservoir. As a result, piston displacement will not create the possibility of the entrance of dirt into the reservoir to contaminate the liquid.

What I claim as my invention is:

1. A master cylinder comprising a body having a fluid chamber, a liquid reservoir and a cylinder with openings at its ends for placing said chamber and reservoir respectively in communication with said cylinder, said body having a partition wall between said chamber and reservoir for sealing said reservoir from communication with the chamber, a piston within said cylinder, a valve for controlling the opening between said reservoir and cylinder having a stem extending through said partition wall, means within said chamber operatively connected to said piston and stem for moving said piston and valve, and packing between said partition wall and stem.

2. A master cylinder comprising a body having a fluid chamber, a liquid reservoir and a cylinder with openings at its front and rear ends for placing said reservoir and chamber respectively in communication with said cylinder, said body having a partition wall between said chamber and reservoir for closing communication between said reservoir and chamber, a piston within said cylinder, a packing between said cylinder and piston for preventing passage in either direction of the fluid and liquid past said piston, a valve for controlling the opening between said reservoir and cylinder having a stem extending through said partition wall, means within said chamber operatively connected to said piston and stem for moving said piston and valve, packing between said partition wall and stem, and means within said chamber acting upon said stem to normally retain said valve in closed position.

3. A master cylinder comprising a body having a fluid chamber, a liquid reservoir and a cylinder with openings for placing said chamber and reservoir respectively in communication with said cylinder, said chamber containing liquid covering the opening between said chamber and cylinder, said body having a partition wall between said chamber and reservoir, a piston within said cylinder, a valve for controlling the opening between said reservoir and cylinder having a stem extending through said partition wall, lever means within said chamber operatively connected to said piston and stem for moving said piston and valve, a shaft extending transversely through said chamber above the liquid therein upon which said lever means is mounted, and packing between said partition wall and stem.

4. A master cylinder comprising a cylinder, a piston movable within said cylinder, a chamber communicating with the rear end of said cylinder and containing liquid to a height above the communication with said cylinder, a liquid reservoir adapted to communicate with said cylinder, said reservoir being closed from communication with said chamber, and means for moving said piston comprising a shaft extending into said chamber above the level of liquid therein, and a lever upon said shaft operatively connected to said piston.

5. A master cylinder comprising a body having a chamber, a cylinder communicating at one end with the chamber and a liquid reservoir, a piston movable within said cylinder and having an end exposed to the interior of the chamber, said chamber adapted to contain liquid to a height above the communication between the cylinder and chamber, said reservoir adapted to communicate with the cylinder in advance of the piston, and said body being provided with a partition between the chamber and reservoir for preventing communication therebetween.

CHARLES W. SINCLAIR.